(12) United States Patent
Godlewski et al.

(10) Patent No.: US 7,746,868 B2
(45) Date of Patent: Jun. 29, 2010

(54) TRANSPORTING MULTI-BASIC SERVICE SET (BSS) FRAMES OVER WIRED MEDIUM PRESERVING BSS-ID

(75) Inventors: Marcin Godlewski, Lawrenceville, GA (US); Charles Moreman, Grayson, GA (US)

(73) Assignee: Cisco Technology, Inc., San Jose, CA (US)

( * ) Notice: Subject to any disclaimer, the term of this patent is extended or adjusted under 35 U.S.C. 154(b) by 188 days.

(21) Appl. No.: 12/020,124

(22) Filed: Jan. 25, 2008

(65) Prior Publication Data
US 2009/0190596 A1 Jul. 30, 2009

(51) Int. Cl.
H04L 12/28 (2006.01)
(52) U.S. Cl. .................................... 370/395.1; 370/328
(58) Field of Classification Search .......... 370/328–332
See application file for complete search history.

(56) References Cited

U.S. PATENT DOCUMENTS

| 7,505,434 B1 * | 3/2009 | Backes | 370/331 |
| 2005/0117537 A1 * | 6/2005 | Okabe | 370/328 |
| 2008/0013487 A1 * | 1/2008 | Molteni et al. | 370/329 |
| 2008/0069024 A1 * | 3/2008 | Iino | 370/313 |
| 2008/0130579 A1 * | 6/2008 | Kurita et al. | 370/331 |

OTHER PUBLICATIONS

LIHP: A Low Latency Layer-3 Handoff Scheme for 802.11 Wireless Networks, 2006, International Symposium on a World of Wireless, Mobile and Multimedia.*
International Search Report dated May 27, 2009 in Application No. PCT/US2009/031660.
John C. Lin et al., "LIHP: A Low Latency Layer-3 Handoff Scheme for 802.11 Wireless Networks," Proceedings of the 2006 International Symposium on a World of Wireless, Mobile and Multimedia Networks, Jun. 2006, pp. 401-409.

* cited by examiner

*Primary Examiner*—Pankaj Kumar
*Assistant Examiner*—Gautam Sharma
(74) *Attorney, Agent, or Firm*—Merchant & Gould

(57) ABSTRACT

A method for retaining network address of a wireless client device as the device roams between different access points operably connected to a single gateway is described. An embodiment comprises maintaining a table in the gateway memory containing the unique identifier of the wireless client device sent with each data packet. In addition to, the unique identifier, an entry in the table in the gateway memory includes the communication pathway established between the gateway and the wireless client device. When forwarding a data packet from the WAN to the wireless client device, the gateway uses the table in the gateway memory to determine the correct destination path for the data packet instead of relying on the destination address attached to the data packet.

42 Claims, 9 Drawing Sheets

TRANSPORTING MULTI-BASIC SERVICE SET (BSS) FRAMES OVER WIRED MEDIUM PRESERVING BSS-ID

FIELD OF THE INVENTION

The present invention relates to the field of wireless local area networks (WLAN). More particularly, this present invention relates to preserving a WiFi client network address as the client transitions between different Access Points (AP).

BACKGROUND OF THE INVENTION

Local Area Networks (LAN) are an integral part of today's homes and businesses, linking computers, printers, and servers. When one of these devices is connected to a LAN, it is assigned a unique network address to be used for as long as the connection is maintained. Increasingly, these networks have also included wireless connectivity. With the popularity of wireless networks increasing, there is a push to provide more services over wireless connections. Besides the traditional data communication support, WLANs are expected to support voice and video applications.

Client devices that support wireless communication typically are equipped with a wireless communication card or an embedded wireless communication module that allows for receiving and transmitting data to and from a wireless AP. The AP is usually attached to the wired LAN and can incorporate a router as a gateway to the wide area network (WAN) for Internet access. A LAN is not restricted to one AP, and in many circumstances, multiple APs are dispersed throughout a facility like an office building or home to provide extended wireless coverage.

The wireless client and AP go through an authentication and association process before the wireless client can establish communication with the LAN, router or WAN. This process is defined in the Institute of Electrical and Electronics Engineers (IEEE) 802.11 standard, incorporated herein by reference. The AP and wireless device connect through one of a plurality of service set identifiers (SSID) available to the AP for establishing a communications pathway. Generally, the wireless device has a default SSID which may be user defined and the AP has a plurality of SSIDs which the wireless device can use to establish a communications pathway. During this process, the wireless client is assigned a network address by the AP.

Commercially available APs generally have a communication range of less than 100 m. However, this range is affected by a number of factors such as, e.g., the location of the AP, indoor vs. outdoor, obstructions, antenna location and type, and output power. When these factors are taken into account, the AP's range is generally limited to a relatively small area such as several rooms in a house or building. To increase the coverage area, more APs wired to the LAN can be added to locations where wireless access is not available. Within the coverage area of an individual AP, a wireless client device can enjoy the benefits of the network, including services provided by the WAN. However, there are limits to the services that wireless clients enjoy.

Most services used by a wireless client require a unique network address associated with the client. This network address is generated when the client first establishes communications with the AP. A challenge occurs when there are multiple APs on a LAN and the wireless client device roams between two or more APs. When a wireless client device is authenticated and associated with an AP, it is assigned a network address that in part indicates which AP the wireless device is using as part of its communication pathway. This address is only valid for wireless communications through that particular AP. The wireless client device generally uses a different address when communicating through a different AP. Therefore, if the wireless client was to roam to a new AP, the previously assigned network address is no longer valid.

The IEEE has recognized this as an impediment to wireless networks. In an effort to address this problem, it developed protocol 802.11R (fast roaming). Intended to refine the transition process of a mobile client as it moves between APs, this protocol permits client devices to retain their networking address as they moves between APs. However, this does not fully address the challenge.

Using 802.11R, a wireless client device can roam to a new AP and still transmit data to the correct destination on the WAN or LAN. However, data transmitted to the wireless device will be routed to the previous AP which the wireless client is no longer associated with. This means that the wireless client device will not receive data intended for it.

Therefore, what is desired is a method for providing the retention of a wireless client communication pathway for transmitting and receiving data as the client roams from between two or more APs wired to the same LAN.

SUMMARY OF THE INVENTION

In order to provide seamless communication for wireless devices, it is desirable to have a system that allows the wireless device to retain its network protocol address when roaming between two or more APs on the same LAN. Embodiments according to the present invention can be regarded as a wireless communication system where the wireless client is able to retain the network address assigned to it by a first AP as the client roams to between different APs and still receive data packets intended for the wireless client, thus increasing the effective range of wireless communication without disrupting established communication links.

In one embodiment, the system includes a router and a plurality of APs. The router provides the LAN with a gateway to the WAN. The LAN can be comprised of the router operably connected to the plurality of APs. To retain the network address of a wireless client device as it roams from the first AP to a second AP, the router utilizes a table in memory to store communication pathway information for each wireless device that has roamed to a new AP after being assigned a network address.

The second AP, when sending data packets from the wireless device to the router will attach a SSID-virtual local area network (VLAN) tag. This tag contains the SSID used by the wireless client device and the second AP as part of the communication pathway. In addition, a unique identifier associated with each wireless client device will be encoded into the SSID-VLAN tag. This unique identifier will remain constant as the wireless client device roams between the plurality of APs. The router builds a table in memory to store the SSID and unique identifier associated with the wireless client device. An entry in this table may include the unique identifier for the wireless client device and the communication pathway information required for communicating between the wireless client device and the second AP. When a data packet is received from the WAN, the router refers to the stored table in memory to determine which communication pathway to use based on the unique identifier associated with the destination device of the data packet.

Additional advantages will be set forth in part in the description which follows or may be learned by practice. The advantages will be realized and attained by means of the elements and combinations particularly pointed out in the appended claims. It is to be understood that both the foregoing general description and the following detailed description are examples and explanatory only and are not restrictive, as claimed.

BRIEF DESCRIPTION OF THE DRAWINGS

The accompanying drawings, not drawn to scale, which are incorporated in and constitute a part of this specification, illustrate embodiments and together with the description, serve to explain the principles of the methods and systems.

DETAILED DESCRIPTION

Before the present methods and systems are disclosed and described, it is to be understood that the methods and systems are not limited to specific synthetic methods, specific components, or to particular compositions, as such may, of course, vary. It is also to be understood that the terminology used herein is for the purpose of describing particular embodiments only and is not intended to be limiting.

As used in the specification and the appended claims, the singular forms "a", "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

"Exemplary" means "an example of" and is not intended to convey a meaning of an ideal or preferred embodiment.

The present methods and systems may be understood more readily by reference to the following detailed description of preferred embodiments and the examples included therein and to the figures and their previous and following description.

Embodiment according to the invention can be understood in the context of a wireless communication system with multiple APs, where a wireless client device can roam between different APs while maintaining a continuous communication pathway to the WAN. In accordance with embodiments according to the present invention, the wireless client device and AP can use IEEE 802.11R protocol (fast roaming) to establish a communication pathway with the WAN. Intended to refine the transition process of a mobile client as it moves between APs, this protocol permits client devices to retain their networking address as they moves between APs.

Figure 1:
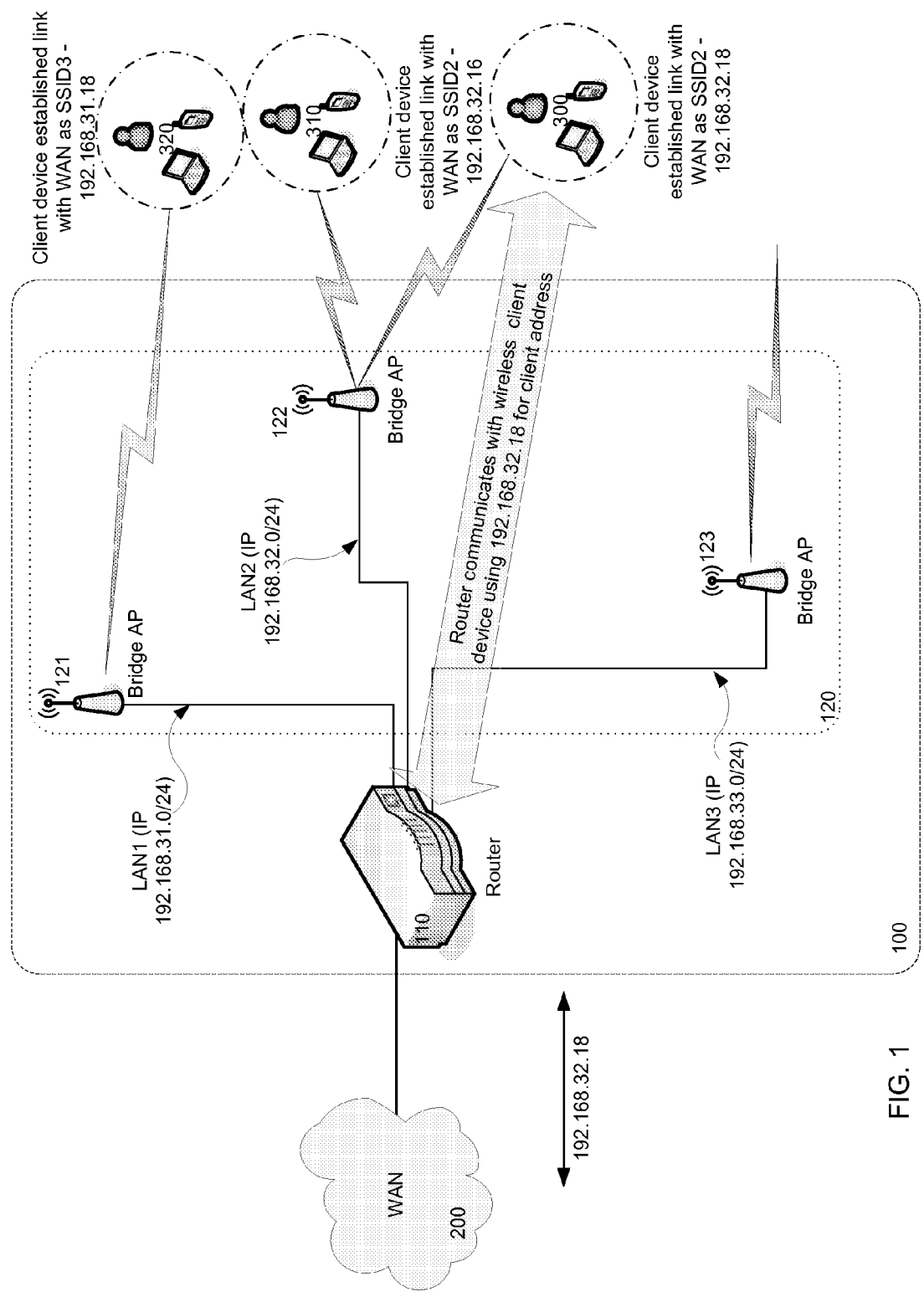
FIG. 1 illustrates an embodiment of a LAN where multiple APs are accessible for wireless client device communication.

FIG. 1 illustrates a simplified non-limiting example of a communication system 100 using multiple APs 121, 122, 123. In this example, router 110 provides a subnet for communication with the WAN 200. Subnet 120 comprises three bridge APs 121, 122, 123. Note, this is but one configuration of a plurality of possible communication systems. In other configurations, the communication system can have a plurality of bridge APs. In addition, other configurations can include a router with APs built in as well as other devices on the subnet such as printers, computers and other network devices.

In one embodiment, wireless client device 300, bridge AP 121, 122, 123 and router AP (not shown in this illustration) support fast roaming protocol. Many types of wireless client devices exist that can be suitably equipped, including but not limited to, laptop computers, personal data assistants, gaming devices, mobile telephones, smartphones, cameras, media players and computer peripherals.

In accordance with embodiments according to the present invention, a wireless client device 300 establishes a communication pathway with the WAN 200 through the router 110 and bridge AP 122. Through fast roaming protocol, the wireless client device 300 and bridge AP 122 establishes a communication pathway based on the availability of common SSIDs. Data packets sent between the wireless client device 300 and bridge AP 122 are identified by the SSID and network address established between the two devices.

According to one embodiment, depending on the destination address, the data packet can be forwarded to a second device 310 associated with the same bridge AP 122. When the destination address is one associated with the bridge AP 122, the bridge AP 122 will forward the data packet to the destination client device 310. The data packet may also be forwarded to a device associated with a second bridge AP 121, depending on the destination address of the data packet. When the destination address of the data packet is not one associated with the bridge AP 122, the bridge AP 122 will forward the data packet to the router 110. Data packets sent between bridge APs 121, 122, 123 and the router 110 are identified by the LAN connection LAN1, LAN2, LAN3 and the network address established between the bridge AP 121, 122, 123 and the wireless client device 300. If the destination address in the data packet is associated with the subnet used by the router 110, the router 110 will send the data packet to the destination bridge AP 121, 122, 123 associated with the subnet for forwarding to the destination device 320.

According to one embodiment, when the destination address is not within the router's 110 subnet, the wireless client device 300 sends the data packets to the WAN 200. Bridge AP 122, after recognizing the destination address of the data packet as not associated with a device connected to one of its SSIDs, would forward the data packet which includes the network source and destination address to the router 110. The router 110 would receive the data packet and if the destination address is not part of its subnet, forward the data packet to the WAN 200.

Upon receiving data from the WAN 200, the router 110 refers to the destination network address in the data packet to determine which LAN connection LAN1, LAN2, LAN3 is needed to provide a pathway to the destination device 300, 310, 320 for the data packet. For example, in FIG. 1, if the destination address for the data packet was 192.168.32.18, the router 110 would recognize this address is associated with LAN connection LAN2. The router 110 sends the data packet to bridge AP 122 over LAN2. Bridge AP 122, examines the destination address of the data packet to determine the correct SSID to use for a pathway to the wireless client device 300.

Figure 2:
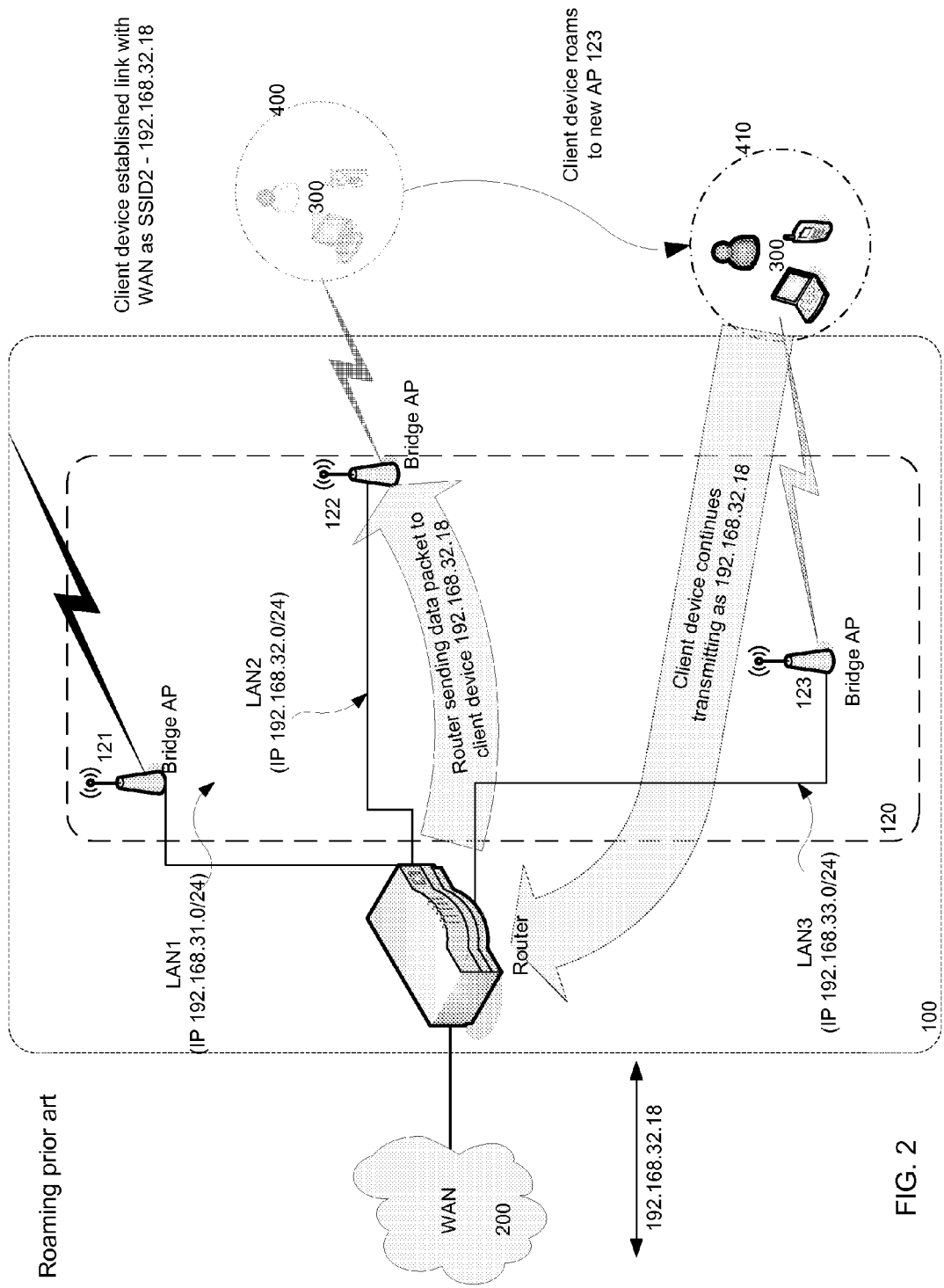
FIG. 2 illustrates a prior art embodiment of a LAN where multiple APs are accessible to wireless client devices where the wireless client device uses 'fast roaming' to establish a communication pathway with a second AP after being assigned a network address from a first.

In accordance with embodiments according to the present invention, once a wireless client device 300, 310, 320 has established a communications pathway with other devices on the LAN 300, 310, 320 or WAN 200 the pathway is maintained as long as the router 110 can associate the network address used by the wireless client device 300, 310, 320 with the bridge AP 121, 122, 123 used by the current communications pathway to the wireless client device 300. As seen in FIG. 2, the communication pathway can change as the wireless client device 300 roams to another location.

FIG. 2 illustrates a wireless client device 310 roaming from one bridge AP 122 to a second bridge AP 123 in the prior art. In this illustration, the communications pathway is interrupted when the wireless client device 300 roams from area 400 where the wireless client device 300 established a pathway with bridge AP 122 using the network address 192.168.32.18 specific to bridge AP 122. Having established a communication pathway to bridge AP 122, the wireless client device 300 moves from area 400 to area 410. Applying one of a plurality of roaming algorithms, the wireless client device determines that the wireless link to bridge AP 123 is now more suited for communicating with the router 110 then the wireless link to bridge AP 122. In area 410, the wireless client device 300 establishes a new communication pathway with bridge AP 123 using 'fast roaming' protocol. In using 'fast roaming' protocol, the wireless client device 300 is able to retain its original network address 192.168.32.18. Data packets sent from the wireless client device 300 to the WAN 200 are not interrupted because the wireless client device 300 still uses the same source network address 192.168.32.18. However, because the wireless client device 300 is still using the same network address 192.168.32.18 associated with bridge AP 122, data packets being sent back to the wireless client device 300 can have the same destination address. This will result in the router 110, forwarding the data packet to the bridge AP 122. The data packet can be lost because the wireless client device 300 is now communicating through bridge AP 123.

Figure 3:
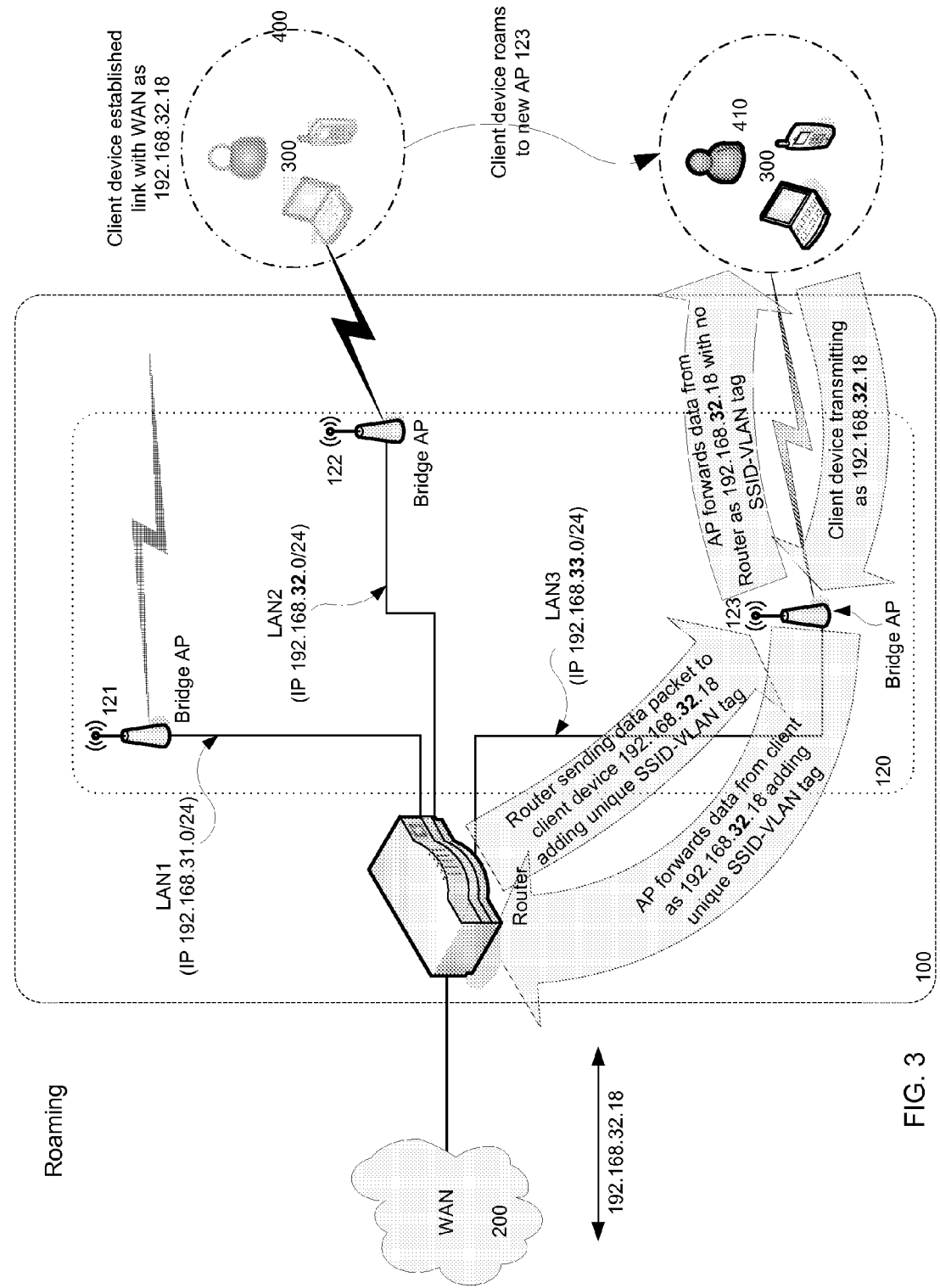
FIG. 3 illustrates an embodiment of a LAN where multiple APs are accessible to wireless client devices where the wireless client device uses 'fast roaming' to establish a communication pathway with a second AP after being assigned a network address from a first AP according to an aspect of the invention.

FIG. 3 illustrates a simplified non-limiting example of data flow over a communication system when applying embodiments according to the invention. As in FIG. 2, the wireless client device 300 establishes a communication pathway with the WAN 200 through the bridge AP 122 and router 110. In doing so, the wireless client device 300 uses the network address 192.168.32.18which is associated with the bridge AP 122.

As the wireless client device 300 roams from area 400 to area 410, the communication pathway with bridge AP 122 is dropped and a new communication pathway is established with the second bridge AP 123 using 'fast roaming' protocol. Like before, the wireless client device 300 still sends data packets to the WAN 200 with a source address associated with the previous bridge AP 122. Now however, prior to the bridge AP 123 sending the data packet to the router 110, the bridge AP 123 will attach a SSID-VLAN tag to the data packet. The SSID-VLAN tag is encoded with a unique identifier for the wireless client device 300. Part of the SSID-VLAN tag is the SSID address used for communication between the second bridge AP 123 and the wireless client device 300. In one embodiment according to the invention, the unique identifier can be the media access control (MAC) address. Note, the unique identifier can be any value that is associated with the wireless client device 300 and is part of the data packet being sent. Using the MAC address is not required to practice the invention.

On receiving the data packet from the bridge AP 123, the router 110 decodes the SSID-VLAN tag information and store to a table in memory the unique identifier, the SSID used by the bridge AP 123 in communicating with the wireless client device 300, the LAN connection LAN3 used by the bridge AP 123 to communicate with the router 110, and a time stamp indicating when the data packet was received. The router 110 then removes the SSID-VLAN tag or set it to zero before forwarding the data packet to the WAN 200.

In one embodiment according to the invention, when the router 110 receives a data packet from the WAN 200, the router 110 compares the unique identifier sent with the data packet with the table in memory storing the SSID-VLAN tag information. The router 110 will compare the unique identifier with those stored to the table in memory. If a match is found, the router determines if the time from the last communication with the wireless client device 300 has elapsed. If so, then the router 110 will remove from stored memory the entry associated with the unique identifier and forward the data packet to the destination device based on the destination address associated with the data packet.

In another embodiment according to the invention, determining elapsed time and removing associated entries stored in the table in memory can be done separate to the event of receiving from the WAN 200 a data packet containing the unique identifier. The determination of elapsed time since the last communication can be a function of other time management algorithms within the router 110 and dependence on the event of receiving a data packet described above is not required to practice the invention.

If time has not elapsed, the router 110 sends the data packet to the destination wireless client device 300. The router uses a table stored in memory to determine the correct pathway to the wireless client device 300. If the unique identifier from the data packet does not match any unique identifiers from the table, then the router 110 forwards the data packet to the bridge AP 121, 122,123 as determined by the network address. If the unique identifier from the data packet matches a unique identifier from the table, then the router 110 forwards the data packet to the bridge AP 121, 122, 123 using the LAN LAN1, LAN2, LAN3 associated with the unique identifier from the table. The router 110 prior to sending the data packet to the bridge AP 121, 122, 123 encodes the unique identifier and the associated SSID from the table in memory to the SSID-VLAN tag of the data packet.

The bridge AP 121, 122, 123 uses the SSID-VLAN tag to determine the SSID used to communicate with the wireless client device 300. Prior to sending the data packet to the wireless client device 300 through the SSID specified by the SSID-VLAN tag, the bridge AP 121, 122, 123 removes or sets to zero the SSID-VLAN tag.

Figure 4:
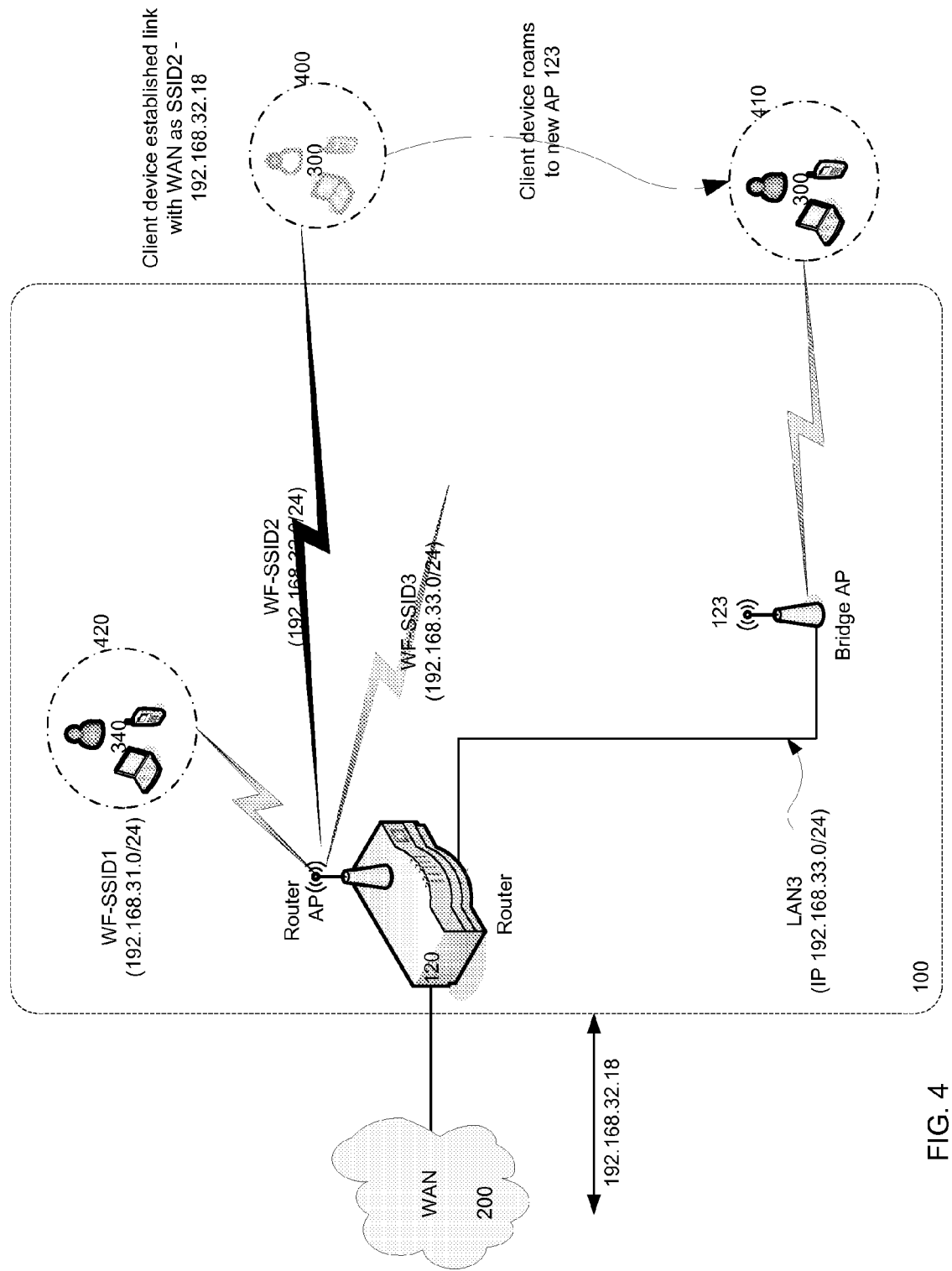
FIG. 4 illustrates an embodiment of a LAN where both router and bridge provide APs to wireless client devices.

FIG. 4 illustrates another simplified non-limiting example of a communication system. In this example, the router AP 120 provides an operably connected LAN connection LAN3 to the subnet as well as providing direct AP connectivity through WF-SSID1, WF-SSID2, WF-SSID3. In this embodiment according to the present invention, the router AP 120 stores into memory the unique identifier, LAN connection and SSID if the data packet came from a bridge AP 123. If the data packet came from one of the plurality of SSIDs, WF-SSID1, WF-SSID2, WF-SSID3, associated with the router AP 120, the router AP 120 stores into the table in memory the unique identifier associated with the wireless client device 340 and the router WiFi-SSID WF-SSID1 used by the wireless client device 340 for communication. Note, while this embodiment has three SSIDs available to the router AP 120, this number of SSIDs is not required to practice the invention.

When receiving a data packet from the WAN 200, the unique identifier from the data packet is used to determine the communication pathway to the wireless client device. If the unique identifier from the data packet matches one stored in the table in memory then the communication pathway associated with the unique identifier is used. The LAN connection and SSID or the WiFi-SSID for the router AP 120 is determined from the stored table in memory and used for the communication pathway.

Figure 5:
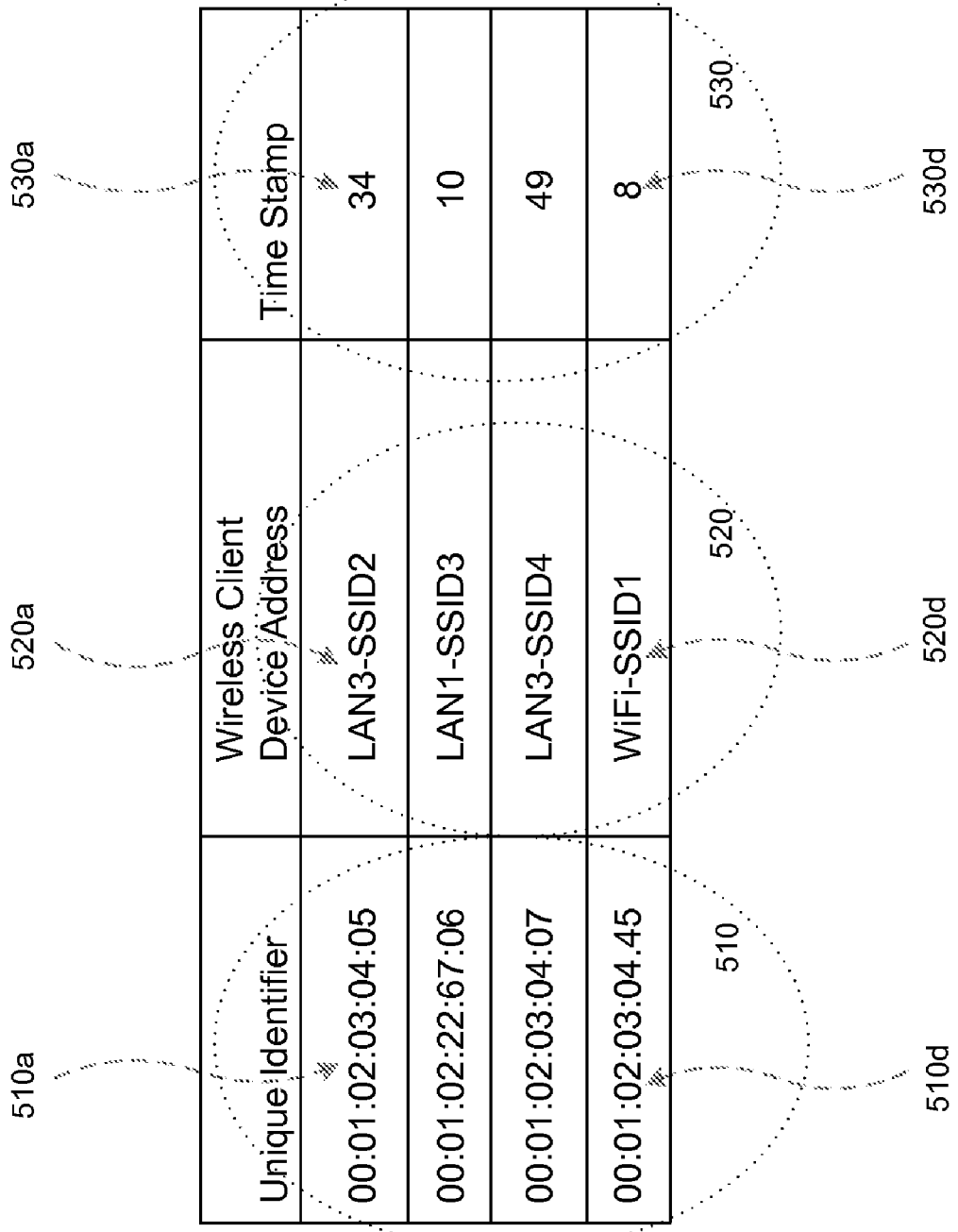
FIG. 5 illustrates an embodiment of a look up table used by the router to track unique identifiers and other information.

FIG. 5 illustrates a simplified non-limiting example of a stored table in memory. Each unique identifier entry 510 in the table is associated with a wireless client device address entry 520 and a time stamp 530. The wireless client device address entry 520 can contain the LAN connection and SSID if the wireless client device has established a communication pathway to the router 120 through a bridge AP 123. The wireless client device address entry 520 can contain the WiFi-SSID of the router AP 120 if the wireless client device has established a communication pathway with the router AP 120 through one of the router AP's 120 plurality of wireless connections WF-SSID1, WF-SSID2, WF-SSID3.

The time stamp 530 is used by the router to determine whether a wireless client device has communicated with any other device and after a predetermined duration, if no traffic is detected, the router 120 can remove from the stored table in memory the entry associated with the wireless client device 300.

Figure 6:
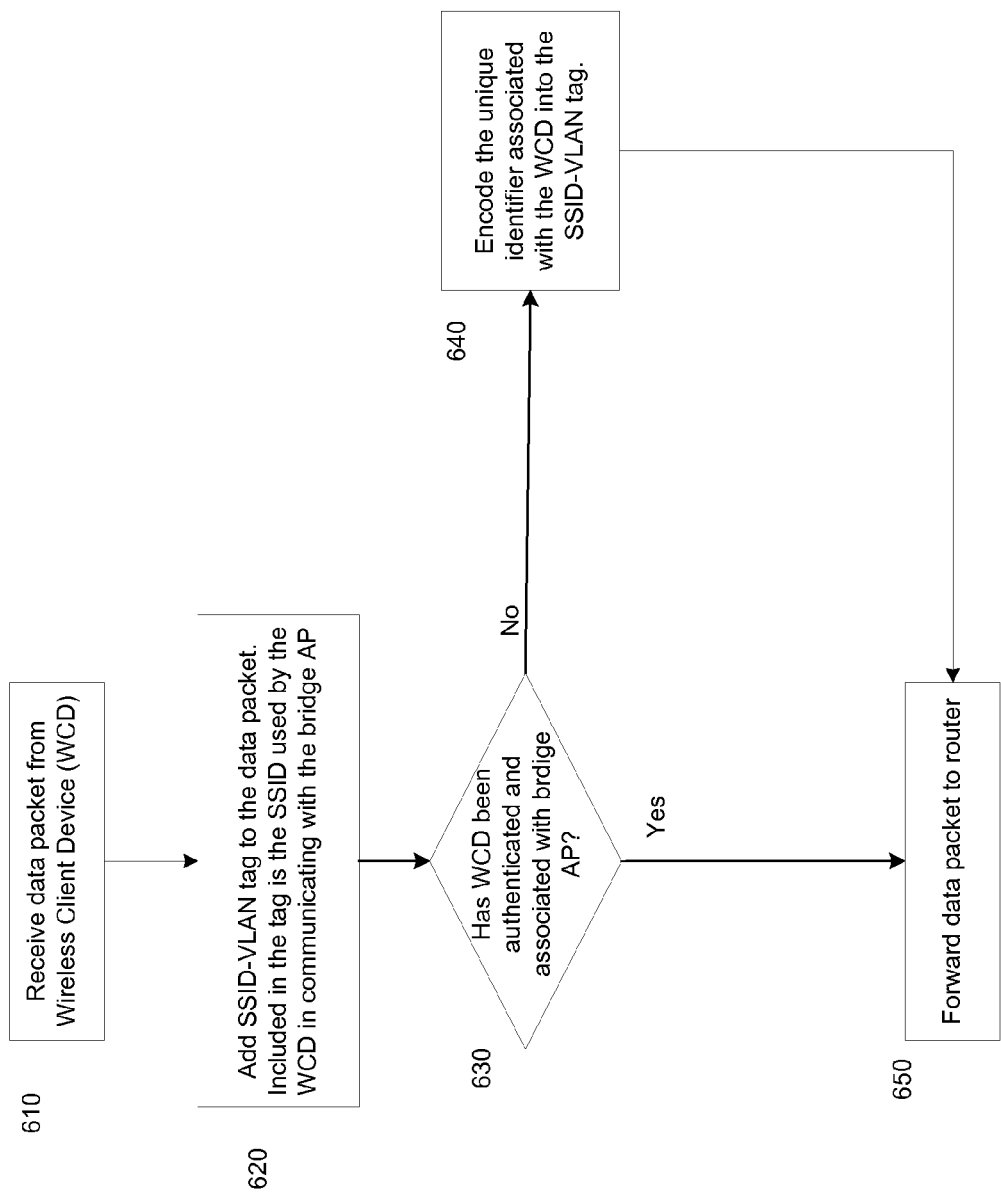
FIG. 6 illustrates an embodiment of a flowchart of a bridge AP process when receiving data from the wireless client device.

FIG. 6 illustrates a simplified non-limiting example of a logical block diagram of a process used by the bridge AP 123 when receiving a data packet from the wireless client device 300. At step 610, the bridge AP 123 receives a data packet from the wireless client device 300. In step 620, the bridge AP 123 adds a SSID-VLAN tag to the data packet reflecting the SSID used by the wireless client device 300 as part of its communication pathway with the bridge AP 123. The bridge AP 123 checks, in step 630, to see if the network address used by the wireless client device 300 is one that the bridge AP 123 associated. If the network address is not one associated with bridge AP 123, then the bridge AP 123 encodes into the data packet's SSID-VLAN tag the unique identifier associated with the wireless client device 300 in step 640. In step 650, with the SSID-VLAN tag encoded, the data packet is forwarded to the destination, generally the router 110. If the network address is associated with the bridge AP 123, then step 640 is bypassed and in step 650, the data packet is forward to the destination, generally the router 110. Note in this embodiment, encoding the unique identifier into the data packet's SSID-VLAN tag is determined by a comparison of network addresses. However in other embodiments, the encoding can be initiated by other determinations such as, but not limited to, configuring the bridge AP 123 to encode the SSID-VLAN tag based on different ranges of network addresses regardless of the association, or other factors which generally create distinction between data packets.

Figure 7:
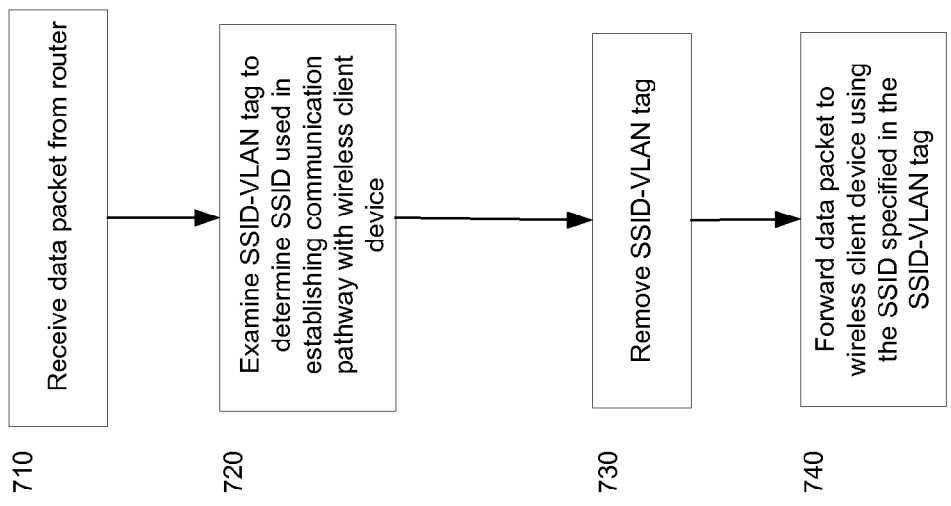
FIG. 7 illustrates an embodiment of a flowchart of a bridge AP process when receiving data from the router.

FIG. 7 illustrates a simplified non-limiting block diagram of the process used by the bridge AP 123 when receiving a data packet from the router 110. After receiving the data packet in step 710, the bridge AP 123 retrieves the SSID needed for communicating with the wireless client device 300 from the SSID-VLAN tag in step 720. The bridge AP 123 then removes the SSID-LAN tag in step 730 and in step 740, forwards the data packet using the SSID previously determined to be part of the communication pathway with the wireless client device 300.

Figure 8:
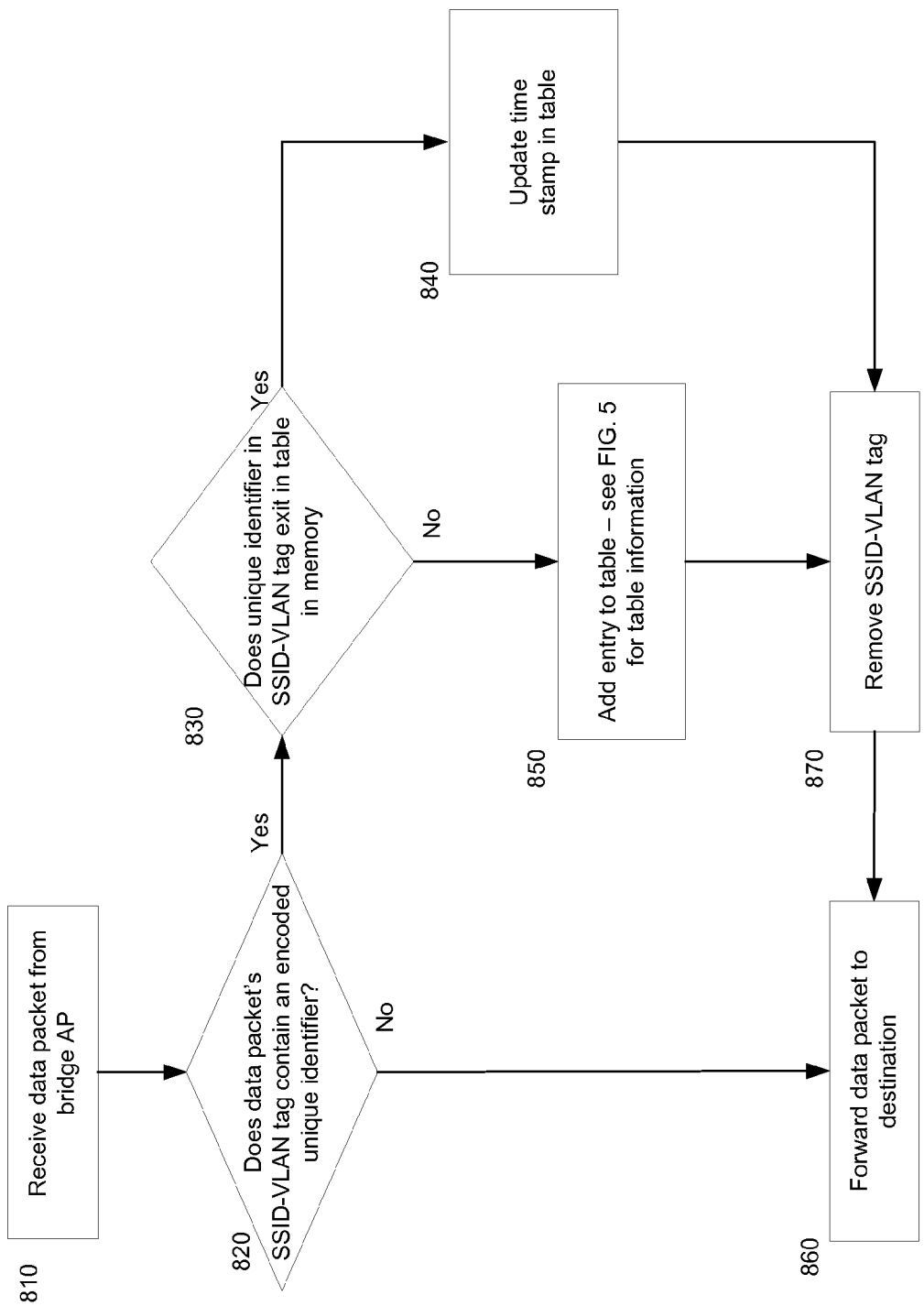
FIG. 8 illustrates an embodiment of a flowchart of a router process when receiving data from the bridge AP.

FIG. 8 illustrates a simplified non-limiting block diagram of the process used by the router 110 when receiving a data packet from the bridge AP 123. After receiving the data packet in step 810, the router 110, in step 820 determines if the data packet's SSID-VLAN tag has an encoded unique identifier. If it does not, the router 110, in step 860 forwards the data packet to the destination network address.

If the data packet does have an SSID-VLAN tag, then at step 830, the router 110 compares the unique identifier in the SSID-VLAN tag with those stored in the table in memory. If a match is detected, the router 110 updates the time stamp at step 840, removes the SSID-VLAN tag at step 870 and forwards the data packet to the destination network address at step 860. If the unique identifier in the SSID-VLAN tag does not match any in the stored table in memory, the router 110, at step 850 adds an entry to the table in memory, removes the SSID-VLAN tag from the data packet at step 870 and forwards the data packet to the destination in step 860. The entry may include the unique identifier 510, the wireless client device address 520 and a time stamp 530. Refer to FIG. 5 for details concerning the stored table in memory.

Figure 9:
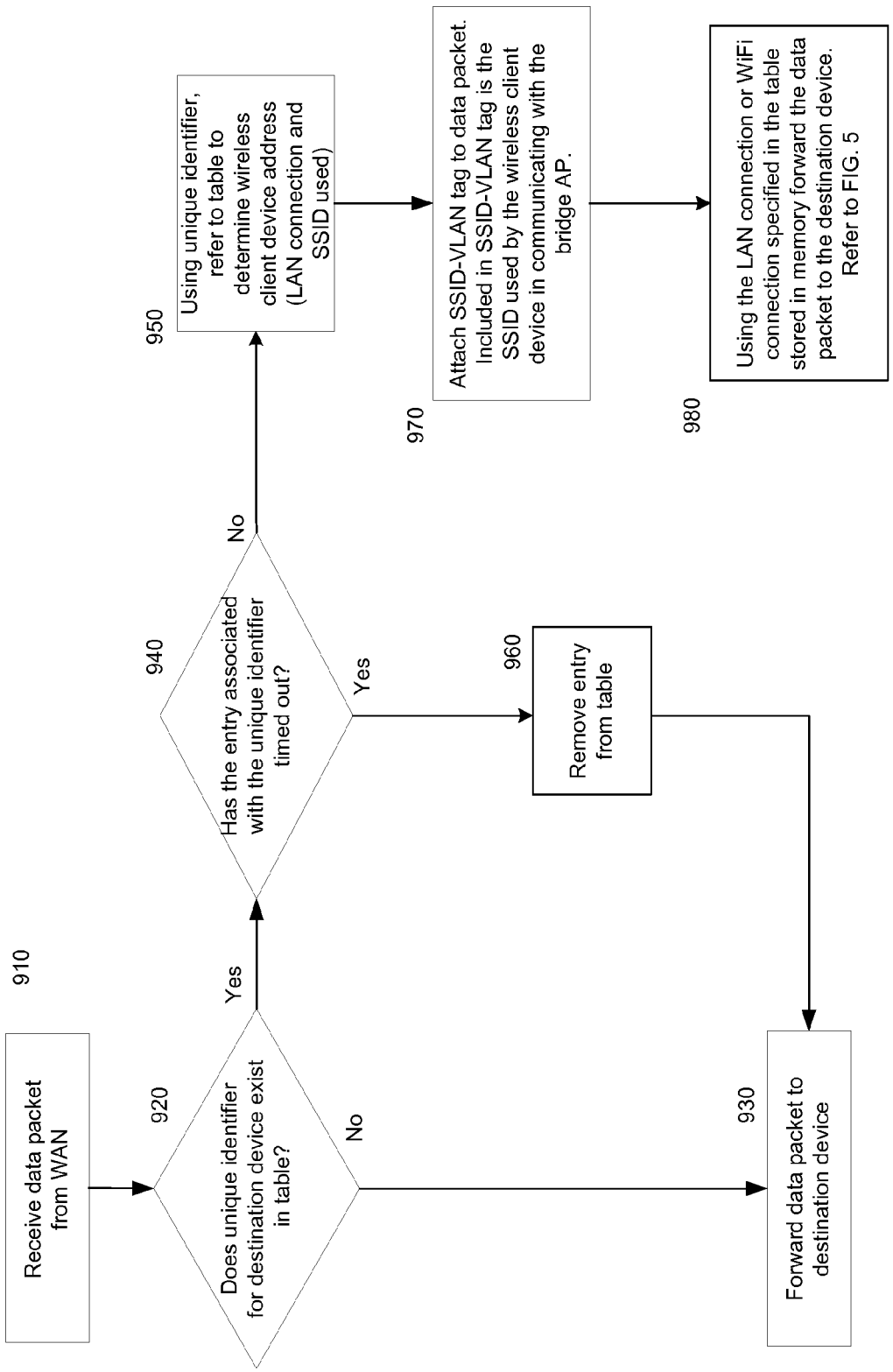
FIG. 9 illustrates an embodiment of a flowchart of a router process when receiving data from the WAN.

FIG. 9 illustrates a simplified non-limiting block diagram of the process used by the router 110 when receiving a data packet from the WAN 200. After receiving a data packet in step 910 from the WAN 200, the router 110, in step 920 determines if the unique identifier associated with the destination wireless client device 300 exists in the table stored in memory. If the unique identifier is not stored in the table in memory, the router 110 forwards the data packet to the destination device in step 930.

If the unique identifier does exist in the stored table in memory, the router 110, in step 940 determines if time has elapsed for this entry. If time has elapsed, in step 960, the router removes the elapsed entry from the table and forwards the data packet to the destination device in step 930. At step 950, if time has not elapsed, the router 110 uses the wireless client device address 520 associated with the unique identifier 510 as the communication pathway to the destination device 300. The router 110, at step 970, attaches a SSID-VLAN tag to the data packet and in step 980, forwards the data packet to the destination device using the communication pathway determined in step 950.

Using FIG. 4 as an example, a data packet with a unique identifier 510a associated with destination device 300 is forwarded to the destination device 300 through the communication pathway comprising of the LAN3 wired connection to bridge AP 123, and SSID2 wireless connection from the bridge AP 123 to the destination device 300. To acquire the LAN3 and SSID2 communication pathway, the router 120 retrieves from its stored table in memory the wireless client device address 520a containing this information. For another example, refer to FIG. 4, a data packet with a unique identifier 510d associated with destination device 340 would be forwarded to the destination device 340 through a WiFi connection on the router AP 120 associated with SSID1. To acquire the SSID1 communication pathway, the router 120 retrieves from its stored table in memory the wireless client device address 520*d* containing this information.

Note, the invention is not limited to managing time out functions dependent on the events described above. The router 110 can, as an example, use independent time management algorithms that check the time stamp stored in the table in memory and remove entries that have had no activity for a predetermined period of time.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as examples only, with a true scope and spirit being indicated by the following claims.

What is claimed is:

1. A method for retaining a network address for a wireless client device that roams between different access points in a LAN comprising:
   communicating to a LAN with a wireless client device through a first access point (AP1) operably connected to a gateway to provide access to a LAN using an available network address associated with AP! and SSID of AP1;
   providing a second access point (AP2) connected to gateway within the LAN, wherein AP2 is some distance away from said AP1;
   communicating between the LAN and the wireless client device through AP2, wherein the wireless client device receives a data packet from the LAN through AP2 while the wireless client device retains the network address associated with AP1, wherein the wireless client device receives the data packet from the LAN through AP2 while the wireless client device retains the network address associated with AP1, comprises the gateway routing a data packet received from a WAN to the correct destination,
   wherein the gateway routing the data packet received from the WAN to the correct destination comprises:
   receiving from the gateway, the encoded data packet for AP2;
   zeroing out a SSID-VLAN tag from the data packet, wherein the SSID-VLAN tag uses a unique identifier associated with the wireless client device other than the MAC address; and
   sending the data packet from AP2 to the wireless client device.

2. The method of claim 1, further comprising:
   providing a third access point (AP3) operably connected to gateway within the LAN, wherein AP3 is some distance away from said AP1 and said AP2;
   communicating between the LAN and the wireless client device through AP3, wherein the wireless client device receives the data packet from the LAN through AP3 while the wireless client device retains the network address associated with AP1.

3. The method of claim 1, wherein communicating to the LAN with the wireless client through AP1 using an available network address and SSID of AP1 comprises the wireless client device sending a data packet on a wireless channel to AP1.

4. The method of claim 1, wherein communicating to the LAN with the wireless client device through AP2 while the wireless client device retains the network address associated with AP1, comprises the wireless client device relying on a preferred communication path to determine that communication with the LAN should be done through a wireless connection with AP2 instead of AP1.

5. The method of claim 4, wherein the preferred communication path is determined by a roaming algorithm.

6. The method of claim 1, wherein communicating to the LAN with the wireless client device through AP2 while the wireless client device retains the network address associated with AP1, comprises the wireless client device sending the data packet with a source network address associated with AP1 on a wireless channel to AP2.

7. The method of claim 1, wherein communicating to the LAN with the wireless client device through AP2 while the wireless client device retains the network address associated with AP1, comprises the gateway and AP2 tracking the wireless client device by associating the wireless client device with a unique identifier.

8. The method of claim 1, wherein communicating to the LAN with the wireless client device through AP2 while the wireless client device retains the network address associated with AP1, comprises the gateway associating the unique identifier with a communication pathway used by the wireless client device when communicating with the LAN.

9. The method of claim 8, wherein the gateway associating the unique identifier with a communication pathway used by the wireless client device when communicating with the LAN, comprises storing a connected LAN connection port used by the gateway in communicating with AP2.

10. The method of claim 8, wherein the gateway associating the unique identifier with a communication pathway used by the wireless client device when communicating with the LAN, comprises storing a wireless SSID connection used by AP2 in communicating with the wireless client device.

11. The method of claim 7, wherein the gateway and AP2 tracking the wireless client device by associating the wireless client device with a unique identifier, comprises AP2 encoding the unique identifier into a SSID-VLAN tag of the data packet before forwarding the data packet to the gateway.

12. The method of claim 11, wherein AP2 encoding the unique identifier into the SSID-VLAN tag of the data packet, comprises of a SSID value in the SSID-VLAN tag corresponding to a SSID used by AP2 as part of the communication pathway with the wireless client device.

13. The method of claim 11, wherein AP2 encoding the unique identifier into the SSID-VLAN tag of the data packet before forwarding the data packet to the gateway comprises:
   receiving the data packet from the wireless client device;
   encoding the unique identifier associated with the wireless client device into the SSID-VLAN tag; and transmitting the data packet with the SSID-VLAN tag attached to the gateway.

14. The method of claim 7, wherein the gateway and AP2 track the wireless client device by associating the wireless client device with a unique identifier comprises:
   receiving an encoded SSID-VLAN tag with the data packet by the gateway; and
   using the encoded unique identifier and SSID included in the SSID-VLAN tag, create an entry in a memory table stored in the gateway.

15. The method of claim 14, wherein creating an entry in a memory table stored in the gateway comprises:
   decoding the unique identifier in the SSID-VLAN tag;
   storing the unique identifier to the entry in the memory table stored in the gateway;
   storing the SSID included in the SSID-VLAN tag to the entry in the memory table stored in the gateway;
   Storing a LAN connected to a connection port used by AP2 in communicating with the gateway to the entry in the memory table stored in the gateway; and
   storing a time stamp to the entry in the memory table stored in the gateway.

16. The method of claim 15, wherein storing the time stamp comprises the gateway using the time stamp to remove entries from the memory table stored in the gateway if the duration since the last transmission of data to or from the wireless client device has exceeded a time limit.

17. The method of claim 1, wherein the gateway routing the data packet received from the WAN to the correct destination comprises:
   determining a unique identifier associated with a destination device of the data packet;
   comparing the unique identifier to a memory table stored in the gateway;
   creating a SSID-VLAN tag for the data packet from a SSID in the memory table stored in the gateway associated with the unique identifier if the comparison returned a match;
   encoding the unique identifier into the SSID-VLAN tag if the comparison returned a match; and
   sending the data packet with encoded SSID-VLAN tag to AP2 using a LAN connected to a connection port associated with the unique identifier if the comparison returned a match or sending the original un-encoded data packet to the destination device if the comparison did not return a match.

18. The method of claim 1, wherein the wireless client device receives the data packet from the LAN through AP2 while the wireless client device retains the network address associated with AP1 comprises the wireless client device moving to a location where a communication signal between the wireless client device and AP2 becomes too weak to maintain and communication signals between the wireless client device and AP1 becomes the preferred communications path.

19. The method of claim 18, wherein the preferred communication path is determined by a roaming algorithm.

20. The method of claim 1, wherein the wireless client device receives the data packet from the LAN through AP2 while the wireless client device retains the network address associated with AP1 comprises AP1 receiving the data packet on the wireless channel communication from the wireless client device which had previously communicated through AP2 and sending the data packet to the LAN.

21. The method of claim 20, wherein AP1 receiving the data packet on the wireless channel from the wireless client device that previously communicated through AP2 and sending the data packet to the LAN comprises the gateway receiving the data packet sent by AP1.

22. The method of claim 21, wherein the gateway receiving the data packet sent by AP1 comprises:
   determining a unique identifier of the wireless client device sending the data packet;
   comparing the unique identifier to entries in a memory table stored in the gateway; and
   changing the stored table in memory to reflect the wireless client device communication pathway and network address are properly associated.

23. The method of claim 1, wherein the wireless client device receives the data packet from the LAN through AP2 while the wireless client device retains the network address associated with AP1 comprises the gateway receiving the data packet from the WAN and sending the data packet to the wireless client device using the correct communication pathway.

24. The method of claim 23, wherein the gateway receives the data packet from the WAN and sends the data packet to the correct communication pathway comprises of using a memory table stored in the gateway with entries creating an association of identifiers unique to the wireless client device and the communication pathway currently used by the wireless client device.

25. The method of claim 24, wherein using the memory table stored in the gateway with entries creating an association of identifiers unique to the wireless client device comprises using a MAC address associated with the wireless client device for a unique identifier.

26. The method of claim 24, wherein using the memory table stored in the gateway with entries creating an association of identifiers unique to the wireless client device and the communication pathway currently used by the wireless client device comprises:
   determining the identifier unique to the wireless client device;
   comparing the unique identifier with the stored table in the gateway memory;
   routing the data packet to AP2 if the unique identifier was found in the stored table in the gateway memory; and
   routing the data packet to the wireless client device through the communication channel based on the destination network address of the data packet if the unique identifier was not found in the lookup table.

27. A system for retaining network addressing for a wireless client device in a wireless networking environment, comprising:
   a gateway device connected with a WAN;
   a plurality of wireless access points connected with the gateway device; and
   one or more wireless client devices connect with the plurality of wireless access points, wherein the gateway device receives a data packet from a wireless access point, store a communication pathway used by the data packet and a unique identifier associated with a source device of the data packet, wherein the unique identifier associated with the source device is a unique identifier other than the MAC address forward the data packet to a destination address, receive a data packet from the WAN, forward the data packet from the WAN to a destination device using the stored communication pathway and unique identifier associated with the destination device, and wherein each of the plurality of wireless access points receive a data packet from a wireless client device, attach a unique identifier associated with the wireless client device to the data packet and send the data packet to the gateway device, receive a data packet from the gateway device, and send the data packet from the gateway device to the wireless client device using the communication pathway determined by the gateway device, wherein the wireless access points send the data packet from the gateway device to the wireless client device using the communication pathway determined by the gateway device comprises of the wireless access points zero out the SSID-VLAN tag from the data packet to be sent to the wireless client device.

28. The system claim of 27, wherein the gateway device sends the communication pathway used by the data packet and a unique identifier associated with the source device comprises the gateway device determines the communication pathway and unique identifier from information attached to the data packet.

29. The system claim of 28, wherein the gateway device determines the communication pathway and unique identifier from information attached to the data packet comprises the data packet having an SSID-VLAN tag attached.

30. The system claim of 29, wherein the attached SSID-VLAN tag comprise the SSID used by the transmitting wireless access point and is encoded with the source device unique identifier.

31. The system claim of 27 wherein the gateway device is configured to store the communication pathway used by the data packet and a unique identifier associated with the source device comprises the gateway device maintains a stored table in memory with the communication pathway and the unique identifier associated with the wireless client device.

32. The system claim of 31, wherein the gateway device maintains a stored table in memory comprises the gateway device removes from the stored table in memory entries with unique identifiers associated with wireless client devices which have not sent or received data packets after a time period.

33. The system claim of 27, wherein the gateway device forwards the data packet received from wireless access point comprises the gateway device removes the SSID-VLAN tag from the data packet received from the wireless access point.

34. The system claim of 27, wherein the gateway device forwards the data packet from the WAN to a destination device using the stored communication pathway and unique identifier associated with the destination device comprises the gateway device compares the unique identifier of the destination device sent with the data packet with the unique identifiers in the stored table memory.

35. The system claim of 31, wherein the gateway device compares the unique identifier of the destination device sent with the data packet with the unique identifier in the stored table comprises the gateway device attaches an SSID-VLAN tag to the data packet, encode the unique identifier onto the SSID-VLAN tag and send the data packet to the destination device using the communication pathway described in the stored table in memory if the unique identifier of the destination device matches one in the stored table in memory.

36. The system claim of 34, wherein the gateway device compares the unique identifier of the destination device sent with the data packet with the unique identifier in the stored table comprises of the gateway device attaches an SSID-VLAN tag to the data packet and send the data packet to the destination device using the communication pathway defined by the destination address if the unique identifier of the destination device does not match one in the stored table in memory.

37. The system claim of 27, wherein the wireless access point sends the data packet to the gateway device comprises the wireless access point attaches an SSID-VLAN tag to the data packet, encode the unique identifier associated with the source device onto the SSID-VLAN tag and send the data packet to the gateway device.

38. The system claim of 37, wherein the wireless access point encodes the unique identifier associated with the source device onto the SSID-VLAN tag comprises the wireless access point encodes the unique identifier associated with the source device when a triggering event is detected.

39. The system claim of 38, wherein the wireless access point encodes the unique identifier associated with the source device when the triggering event is detected comprises the wireless access point determines the triggering event.

40. The system claim of 38, wherein the wireless access point encodes the unique identifier associated with the source device when the triggering event is detected comprises the wireless access point generates the triggering event when the source network address of the data packet is not one of the network addresses associated with the wireless access point.

41. The system claim of 27, wherein the wireless access point sends the data packet from the gateway device to the wireless client device using the communication pathway determined by the gateway device comprises the wireless access point uses the communication pathway described in the SSID-VLAN tag.

42. The system claim of 27 wherein the plurality of wireless access points connected to the gateway device comprises at least one wireless access point being designed into the wireless client device.

* * * * *